Figure 1:
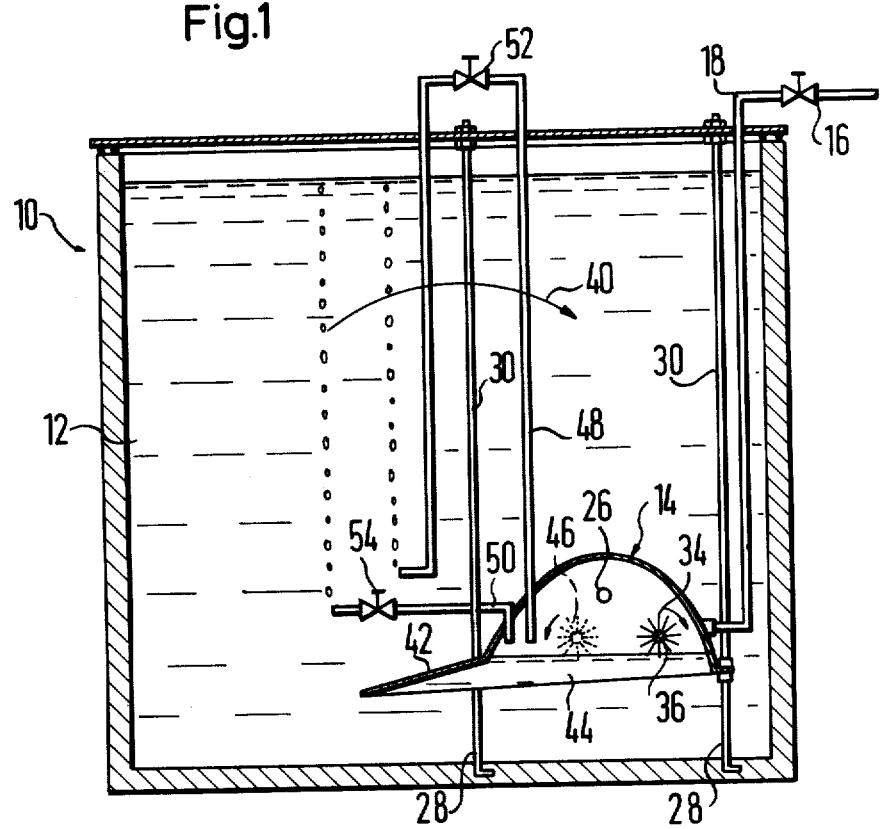

United States Patent [19]

Schreiber

[11] 3,925,522
[45] Dec. 9, 1975

[54] APPARATUS FOR DISSOLVING OXYGEN IN WATER

[76] Inventor: Richard Schreiber, Martinstrasse 31, 61 Darmstadt, Germany

[22] Filed: Apr. 3, 1973

[21] Appl. No.: 347,579

[30] Foreign Application Priority Data
Apr. 7, 1972 Germany............................ 2216917

[52] U.S. Cl.................. 261/92; 261/93; 261/121 R
[51] Int. Cl.² ........................................... B01F 3/04
[58] Field of Search............... 261/91, 92, 121 R, 93

[56] References Cited
UNITED STATES PATENTS

| | | | |
|---|---|---|---|
| 1,544,130 | 6/1925 | Christensen | 261/92 |
| 3,311,363 | 3/1967 | Phillips et al. | 261/91 X |
| 3,643,403 | 2/1972 | Speece | 261/91 X |
| 3,794,303 | 2/1974 | Hirshon | 261/92 X |

FOREIGN PATENTS OR APPLICATIONS

| | | |
|---|---|---|
| 1,137,690 | 10/1962 | Germany |
| 1,166,104 | 3/1964 | Germany ............... 261/92 |

Primary Examiner—Frank W. Lutter
Assistant Examiner—William Cuchlinski, Jr.
Attorney, Agent, or Firm—John J. Dennemeyer

[57] ABSTRACT

An apparatus for dissolving oxygen in a body of water comprising an elongate trough shaped receptacle disposed horizontally in a water container below the water surface. A supply of oxygen gas is continuously fed from one end into the trough shaped receptacle which is disposed in the container in an inverted position so that the gas does not readily escape from the trough. A brush extends throughout the trough to mix the oxygen gas and causes it to travel longitudinally of the trough with the water and create a water flow so that undissolved gas is discharged into the water outside the trough.

12 Claims, 2 Drawing Figures

APPARATUS FOR DISSOLVING OXYGEN IN WATER

The invention relates to an apparatus for dissolving oxygen in water comprising an elongate receptacle which is disposed horizontally in a natural or artificial body of water below the water level. The receptacle is closed at the top and filled partly with an oxygen-containing gas supplied continuously thereto under a pressure which is approximately that of the hydrostatic pressure at the location of the receptacle. A rotor is mounted inside the receptacle for mixing the gas and water and to create a water flow through the receptacle whereby undissolved gas is discharged from the receptacle and into the water outside the receptacle in the form of bubbles.

An apparatus of this general type has been disclosed in German Pat. publication (Offenlegungschrift) No. 1 800 315. In that apparatus the rotors are disposed in a vertical position in the receptacle. They draw the water from the lower portion of the receptacle upwardly where it is deviated and discharged radially outwardly in all directions from the receptacle. This prior art arrangement presents the disadvantage that the water which flows laterally from the container may return after a short travel again to the lower part of the recptacle and is drawn in again, which reduces the efficiency of the device with regard to the introduction of oxygen into the water. It is possible to eliminate this disadvantage partly by mounting a sheet metal guide at the lower end of the receptacle which prevents a direct return to the lower part of the receptacle by the water which has been laterally discharged. However, this increases the cost of the installation. A further disadvantage inherent in this known device consists in the fact that the water leaving the container flows off laterally in all directions. This produces only to a small degree a circulation of the water to be enriched with oxygen, which is indeed the basic requirement in applications to treat stagnant water and in water activating basins, so that the entire volume of the water body is saturated with oxygen. An important disadvantage of the known device resides additionally in the fact that a relatively small, continuously introduced air volume is mixed intimately with the total air volume contained in the receptacle immediately upon entering the container. This air volume has essentially the same partial pressure of the oxygen due to the release of oxygen into the water as that of the air bubbles leaving the receptacle. As a result not the complete partial pressure that is present in the air introduced under pressure becomes effective for the introduction of the oxygen into the water.

An other apparatus for dissolving oxygen in water, in which an activating brush is mounted for rotation on a horizontal shaft, has been disclosed in German Pat. No. 1 137 690. In this arrangement the air available at the surface of the water is slapped into the water. In the same context it is known to use rotors in the form of conveyor wheels instead of the brushes, and feeding air to these rotors from the front side as well as by means of air conduits in the circumferential direction so that at both ends of the rotors, partly in the longitudinal direction of the housing receiving the rotors, opposite air currents are produced. These devices are not designed to make better use of the partial pressure of the oxygen when an oxygen containing gas is introduced under pressure. Furthermore when a rotor in the form of a conveyor wheel is used the housing of the device is so constructed that the water is drawn up also again from the lower part of the housing and ejected along both longitudinal sides of the housing in opposite directions, so that the same disadvantages are created as in the known device mentioned above.

It is therefore an object of the present invention to provide an improved apparatus of the above mentioned type so that an increased introduction of oxygen into a large volume of the water is obtained.

The object of the invention may be obtained with an apparatus of the general type disclosed above by providing an arrangement in which the gas flows through the receptacle in the longitudinal direction, and in that the rotor consists of at least one brush mounted on a horizontally mounted shaft extending longitudinally through the receptacle over approximately its entire length and immersed below the water surface in the receptacle.

With the arrangement of the invention where the gas flows through the receptacle in the longitudinal direction the partial pressure of the oxygen contained in the gas drops approximately linearly from the point of introduction at one end of the receptacle to the discharge point at the opposite end of the receptacle. The partial pressure of the oxygen lies thus within the receptacle almost at all points above the partial pressure of the oxygen in the air bubbles that are discharged from the receptacle. In this way an improved introduction of the oxygen into the water is obtained. The rotating brush produces practically no disturbance in the mentioned partial pressure distribution of the oxygen because one section of the brush produces in each instance a thorough mixing of the oxygen containing gas and water only in a plane which is perpendicular to the axis of the brush, without causing a mixing of more strongly oxygen containing gas with less strongly oxygen contianing gas in the longitudinal direction of the housing. This type of mixing is also avoided by the gas current which is continuously fed through the housing, which excludes that a gas of lower oxygen content travels in the direction towards the point of introduction of the gas and mixes with gas of higher oxygen content. A further advantage of the use of a brush on a horizontal shaft extending longitudinally in the housing resides in the fact that the surrounding water is drawn in at one longitudinal side of the housing at its underside, is accelerated below by the brush and leaves the device at the opposite longitudinal side of the housing at its underside. Due to this single flow direction one obtains in comparison with water that is discharged from the housing on all sides in opposite directions an improved circulation of the water body.

Figure 2:
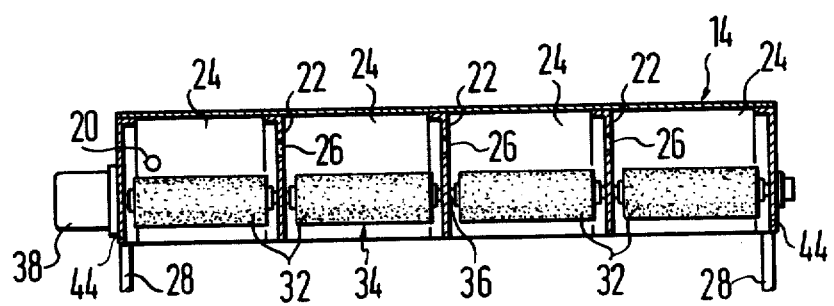

The invention will be described in greater detail hereafter with reference to the accompanying drawing illustrating an embodiment of the invention and in which:

FIG. 1 shows an apparatus for introducing oxygen into water according to the invention and, FIG. 2 represents a longitudinal section through the apparatus according to FIG. 1

The invention illustrated in FIG. 1 shows an activating basin 10 which contains a body of water 12 in which a trough like receptacle 14 is mounted and so positioned that it is open toward the bottom of the apparatus. Air under pressure is supplied to the receptacle 14 through a valve 16 and a pipe 18. In FIG. 2 it may be seen that the inner supply opening 20 is located at one end of the receptacle 14 and communicates with pipe 18. The receptacle 14 has an elongate shape as indicated in FIG. 2. It is sub divided by means of cross walls 22 into a plurality of chambers 24 connected in sequence relative to the flow of air under pressure. Adjacent chambers 24 are connected in each case with communicating openings 26 in the cross walls 22. In this way the compressed air of lower oxygen content is not mixed with compressed air of higher oxygen content, whereby the efficiency of the oxygen input is increased. The oxygen containing gas is preferably supplied to the receptacle 14 in such a quantity that the partial pressure of the oxygen from the supply opening 20 at the one end of receptacle 14 decreases approximately linearly toward the discharge point at the opposite end of receptacle 14.

In view of the fact that the receptacle 14 is subjected to updraft forces it may be anchored to the wall of the basin 10 by means of feet 28. Its distance from the floor of the basin is preferably not more than 3 meters. A further possibility of anchoring or mounting the receptacle 14 is by means of rods 30 extending to the top of the basin and the receptacle 14 may be lifted out of the water for repairs either together with the rods 30 or guided along the rods.

In order to produce a mixing of air and water, brushes sections 32 are mounted in all the chambers 24. The brush sections 32 combine to constitute a brush 34 and are mounted on a common shaft 36 which extends in the longitudinal direction of the receptacle 14. The shaft 36 is driven by a driving device, preferably an underwater motor 38. In this manner the same direction of rotation of all the brush sections 32 is obtained and this produces advantageously an acceleration of the water 12 below the receptacle 14 in a definite direction, whereby a circulation of the water 12 in the basin 10 in the direction of the arrow 40 is produced.

In order to obtain a further improvement of the input effect the embodiment illustrated in the drawing is provided with a skirt 42 which constitutes an extension of the receptacle 14 at that particular lower edge toward which the brush 34 moves the water 12 during its rotation. The skirt 42 is inclined slightly downwardly and outwardly from the lower edge of receptacle 14. The air bubbles which are created by the mixing of the oxygen gas with the water collect at this skirt and are returned at least partly against the direction of flow of the water 12 in an upwardly inclined direction into the receptacle 14. The front sides 44 of the receptacle 14 are extended downwardly to a point where an escape of the air bubbles collected below the skirt 42 is impossible in one of the longitudinal directions of the receptacle 14.

Adjacent the brush 34 and parallel to it a second brush 46 indicated in dash lines in FIG. 1 may be provided, which may rotate in the opposite direction of the brush 34 and operate with a smaller effect. The brush 46 introduces also oxygen but slows the movement of the water 12 at the water level inside the receptacle 14. Air bubbles that are produced during the mixing can thus be more easily collected at the skirt 42 and returned to the receptacle 14.

After the compressed air flows through the chambers 24 it is discharged from the right hand chamber 24 as shown in FIG. 2. This discharge is carried out through the pipes 48, 50 and the valves 52, 54 shown in FIG. 1. Due to the different length of the pipes 48, 50 in the basin 10 and the position of the valves 52, 54 the height of the water level inside the receptacle 14 and thus the immersion depth of brush 34 and of brush 46 may be regulated so that the input effect of the oxygen may be varied. At the outlet of the pipes 48, 50 the compressed air is blown into the water 12 of the basin 10, or in other types of application into a natural water body, in the form of large bubbles. The position of the outlets of pipes 48, 50 may be so chosen that the upwardly floating bubbles contribute to the circulation of the water 12 in basin 10 in the direction of the arrow 40 or to produce a spiral circulation as additional circulation perpendicularly to the arrow 40.

The level of the outlet opening of the pipes 48, 50 in the activating basin 10 is only slightly higher than that of the water level in receptacle 14 so that the hydrostatic pressure at the pipe opening is in each instance only slightly smaller than the pressure of the gas which is removed from receptacle 14. This assures that the compressed air removed from receptacle 14 is introduced in all cases into the water 12, and that on the other hand the gas bubbles in the water 12 of the basin 10 have still a ceiling for floating upwardly which is as high as possible.

Instead of providing special pipes for discharging the compressed air from the receptacle 14 or in addition to this measure, the discharge can also be obtained by a corresponding dimension of the skirt 42 at its free end. For this purpose it may be provided, and this is not shown in detail in the drawing, that the skirt 42 begins at that end of receptacle 14 at which the introduction of the gas is made, and that at the end of receptacle 14 at which the discharge of the gas is made the outwardly located free edge of the skirt 42 is positioned higher than on the remaining length of skirt 42. Accordingly the gas may escape at this point laterally from under the skirt 42, without being hindered by the skirt 42 as in the case of a skirt having a free edge which extends all the way across the length of the receptacle 14.

A further design feature which is not illustrated and which is particularly suitable for applications in natural water bodies is characterized by the fact that a receptacle of the same type as receptacle 14 is maintained by a float member which floats on the free surface of the water to maintain the receptacle at its predetermined level. In this arrangement the receptacle may be fixed by means of a rigid connection to the float member. In all types of applications the receptacle will carry a ballast weight which will give it preferably a weight that is at least as large as the updraft forces which act on the receptacle. Depending on the weight of the receptacle it may also be suspended by chains, side pieces or the like from the float member.

The use of compressed air for the introduction of oxygen would include also the use of a gas mixture of higher oxygen content, especially of industrial oxygen, and in some applications also the use of pure oxygen.

What is claimed is:

1. Apparatus for dissolving oxygen in water comprising an elongate inverted channel shaped receptacle, closed at the top, completely submerged below the surface of a body of water and filled partly with an oxygen containing gas to establish a gas-water interface in said receptacle at a higher than atmospheric pressure, means for supplying gas to the receptacle continuously under at least approximately the hydrostatic pressure at the location of the receptacle, and at least one rotary brush mounted in the receptacle for rotation across said interface for mixing the gas and the water and for producing a water flow across the receptacle, discharge means for removing the gas which is not dissolved from the receptacle and introducing the same in the form of bubbles into the body of water outside the receptacle, the improvement comprising means for causing the gas to traverse the receptacle from an inlet at one end thereof in the longitudinal direction thereof to an outlet at the other end, said brush extending approximately over the entire length of the receptacle and being mounted on a shaft which extends in the longitudinal direction of the receptacle, said discharge means comprising a pipe and a valve connected in the pipe, the opening of the pipe through which the gas is introduced into the water outside the receptacle being at a depth at which the hydrostatic pressure is slightly smaller than the pressure of the gas discharged from the receptacle.

2. Apparatus according to claim 15 wherein said means for supplying gas is arranged so that gas is supplied to the receptacle in such an amount that the partial pressure of the oxygen from the inlet at the one end of the receptacle to the outlet at the opposite end of the receptacle decreases approximately linearly.

3. Apparatus according to claim 2 wherein the receptacle is open at the bottom.

4. Apparatus according to claim 3 wherein the receptacle is subdivided by means of cross walls into a plurality of chambers disposed in longitudinal array and in each chamber a partial section of the brush is disposed, each cross wall having an air passage therethrough.

5. Apparatus according to claim 4 including discharge means to vary the height of the water level in the receptacle.

6. Apparatus according to claim 1 wherein the valve is located above the surface of the body of water.

7. Apparatus according to claim 6 wherein the lower edge of the receptacle toward which the brush moves during its rotation is extended to form a skirt which is directed from the lower edge outwardly and has a slight inclination downwardly.

8. Apparatus according to claim 7 wherein the skirt begins at that end of the receptacle where the gas is introduced and that at the end of the receptacle where the gas is discharged the outward free edge of the skirt is disposed higher than on the remaining length of the skirt.

9. Apparatus according to claim 8 wherein an additional brush is mounted in the receptacle parallel to said one brush the additional brush having a smaller output and being driven in the opposite direction.

10. Apparatus according to claim 9 wherein the receptacle is maintained in a predetermined position in the body of water by means of a float member which floats on the water surface.

11. Apparatus according to claim 10 wherein the receptacle is fixed by rigid connection means to the float member.

12. Apparatus according to claim 10 wherein the receptacle is suspended from the float member by suitable means such as chains and ropes.

* * * * *